United States Patent
Dutto et al.

[11] Patent Number: 5,575,828
[45] Date of Patent: Nov. 19, 1996

[54] BOTTLE EXTRACTOR FOR HOLLOW GLASS MOLDING MACHINES

[75] Inventors: Ivo Dutto; Alfonso Arechaga, both of Llodio, Spain

[73] Assignees: Vidrala S.A.; Avacon S.A., both of Spain

[21] Appl. No.: 206,507

[22] Filed: Mar. 4, 1994

[30] Foreign Application Priority Data

Jul. 5, 1993 [ES] Spain ................................ 9301509

[51] Int. Cl.$^6$ .......................... C03B 9/453; C03B 35/04
[52] U.S. Cl. .......................... 65/158; 65/260; 198/468.01; 198/740
[58] Field of Search .......................... 65/158, 163, 260; 318/282, 286; 198/468.01, 740

[56] References Cited

U.S. PATENT DOCUMENTS

| | | | |
|---|---|---|---|
| 4,203,752 | 5/1980 | Becker et al. | 65/158 |
| 4,409,013 | 10/1983 | Cardinas et al. | 65/163 |
| 4,923,499 | 5/1990 | Newkirk | 65/163 |
| 5,125,499 | 6/1992 | Saathoff et al. | 198/468.01 |
| 5,289,090 | 2/1994 | Miller et al. | 318/282 |

Primary Examiner—Donald E. Czaja
Assistant Examiner—Steven P. Griffin
Attorney, Agent, or Firm—Lucas & Just

[57] ABSTRACT

Improved bottle extractor for hollow glass molding machines of the type consisting of a mechanical arm for transfer of the hollow glass, with a stepping motor whose output shaft connects directly with the drive shaft of the mechanical arm, the motor being insulated from the rest of the extractor by means of a sheet of thermal insulating material and with a position detector based on the effect produced by an integral plate that has the same axis of rotation as the drive shaft.

2 Claims, 2 Drawing Sheets

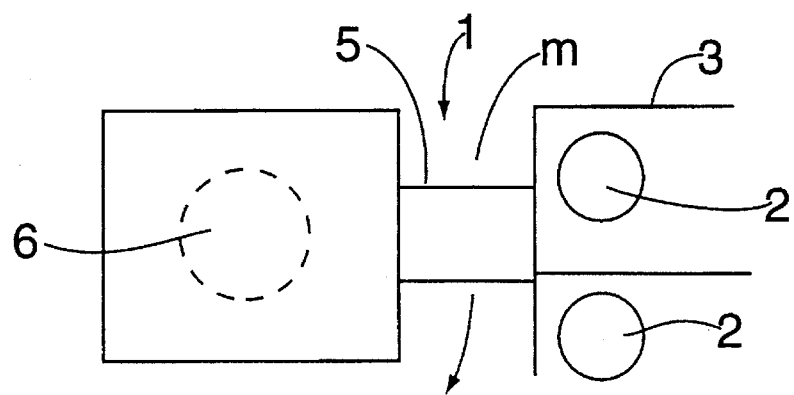
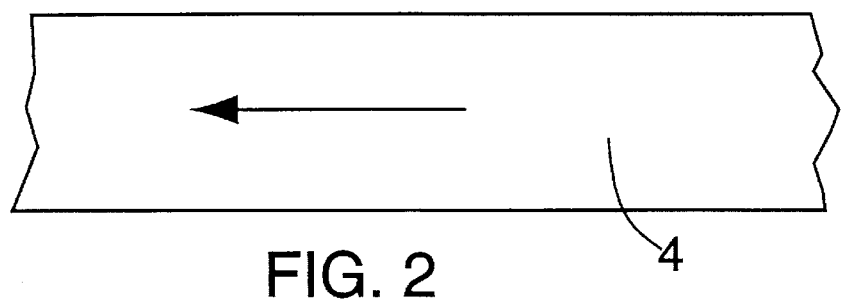
FIG. 2
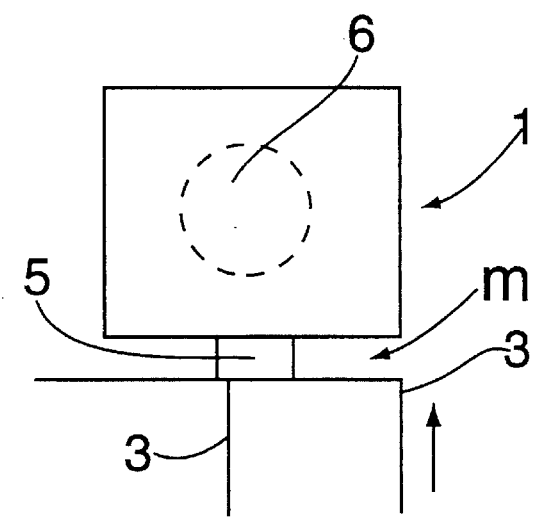
FIG. 3
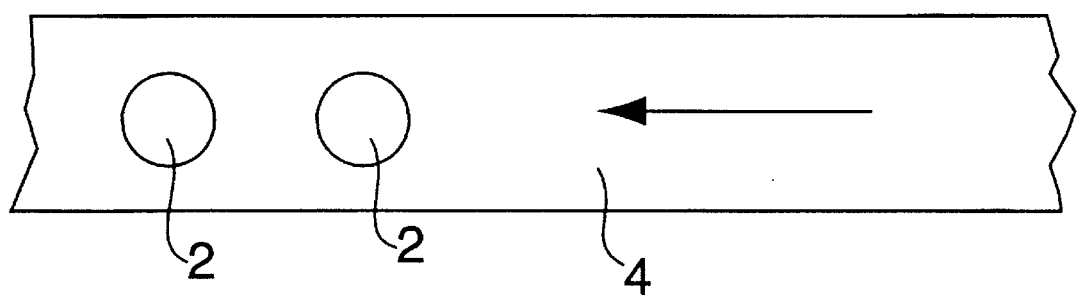

BOTTLE EXTRACTOR FOR HOLLOW GLASS MOLDING MACHINES

FIELD OF THE INVENTION

The electronic bottle extractor is an electro-mechanical system that effects transfer of the bottles from the bottle-shaping machine (I.S.:) to the conveyor belt of the bottle-conveyance system synchronized by the drive.

The bottle transfer movement is performed by a mechanical arm actuated by a motor that will carry out the velocity paths of forward and backward motion according to the operative parameters and production rate of the machine, and can be controlled by programmed intelligent means.

COMPARISON OF THE ART WITH THE PRESENT INVENTION

The present need is for an extractor which would solve the current serious problem of maintenance due to the aggressive environmental and thermal conditions which may exceed 120° C., so that the average life of the motor of 18 months can be increased to a minimum of 10 years, in addition to doing away with the need for semiannual disassembly of the extractor for lubrication of a reducer, with consequent loss of production.

SUMMARY OF THE INVENTION

The present invention procures an improved bottle extractor for hollow glass molding machines of the type consisting of a mechanical arm for transfer of the hollow glass, which is characterized in that it consists of a stepping motor whose output shaft connects directly with the shaft of the mechanical arm, the motor being insulated from the rest by means of a sheet of heat-insulating material.

BRIEF DESCRIPTION OF THE DRAWINGS

FIG. 2 is a schematic view of the position of the extractor with the bottles recently received.

FIG. 3 is a schematic view of the position of the extractor after having deposited the bottles on the conveyor belt.

DESCRIPTION OF PREFERRED EMBODIMENTS

Figure 1:
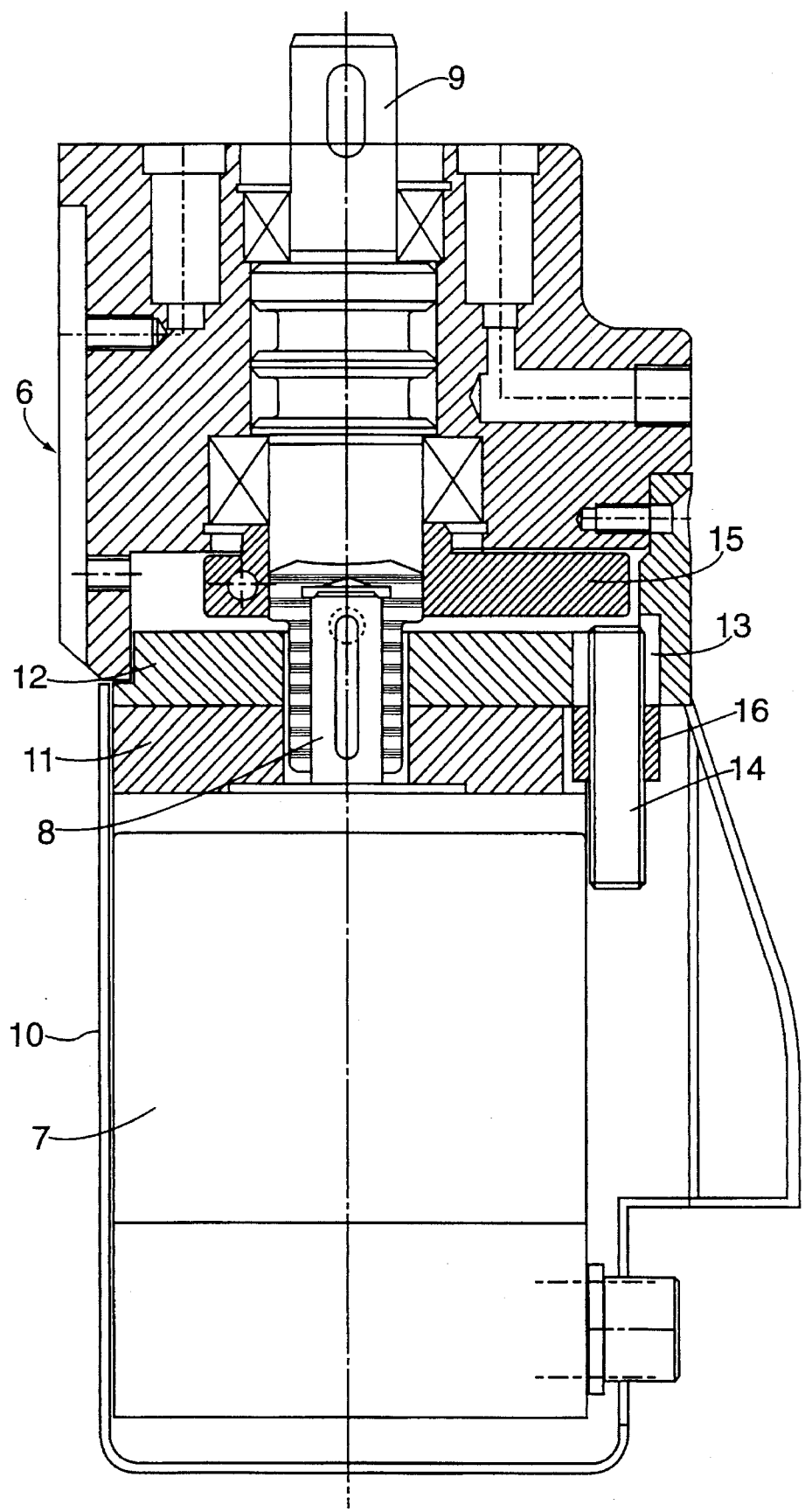
FIG. 1 is a sectional view of the drive elements of the mechanical arm for the extraction of bottles, subject of the invention.

Two positions of the extractor (1) have been represented in FIGS. 2 and 3, but only by way of illustration, since it takes a series of positions, not represented because they are unnecessary for clear understanding of the invention.

From the bottle-shaping machine (not represented) the bottles (2) have been deposited in the position of FIG. 2 between the fingers (3) of the mechanical arm (m) of the extractor (1).

The extractor (1) has to convey said bottles (2) to the conveyor means or belt (4), adjust itself to the characteristics of movement of the said belt (4), leave the bottles (2) on the belt, retract the fingers (3) on the guides (5) and return to its initial position.

All of this requires that the electromechanical device (6) controlling the movement of the fingers (3) follow very precise and previously established velocity paths.

There is provided a stepping motor (7), for example a Pacific-Scientific motor, which may be under the control of a microprocessor, the output shaft (8) of which connects directly with the drive shaft (9) of the extractor (1).

The motor (7) is protected by the housing (10).

When no reducing box exists between the motor (7) and the drive shaft (9), greases, mechanical transmissions and damage thereto, with their costly maintenance, disappear.

To insulate the motor (7) thermally from the heat sources which may subject the extractor (1) to 120° C. and an aggressive environment, a sheet (11) of a thermal insulator, for example, a plastic insulator such as polyvinyl, Teflon, polyethylene, etc., is provided.

The motor (7) is enclosed by a cover (12) having an opening (13) for a position or proximity detector (14) based on inductive effect in combination with a plate (15) fixed to the shaft (9).

The position detector (14) is mounted on a thermal insulator (16) to avoid a thermal bridge.

Depending upon its positioning, and given the specific configuration of the plate (15) in FIG. 1, it will serve for right or left hand.

As can be seen, when there is no transmission of heat to the motor (7) the need for supplementary cooling is eliminated and the detectors do not deteriorate, and when transmission from shaft (8) to shaft (9) is direct the proximity detector may be placed in any position with respect to them and, consequently, alternatively in a cold zone.

It will be noted that in FIG. 1 the insulating sheet (11) is provided only frontally with respect to the motor (7), but covering the motor (7) completely or partially with a thermal insulator in order to obtain the objective indicated falls within the scope of the invention.

We claim:

1. A bottle extractor for extraction of hollow glass articles from molding machines comprising a drive shaft and a mechanical arm for transfer of the hollow glass articles, said bottle extractor being driven by a stepping motor having an output shaft, said output shaft being directly connected to the drive shaft of the bottle extractor, said bottle extractor being operative through said mechanical arm to extract said hollow glass articles from said molding machines and to transfer said hollow glass articles to a conveyor belt, said stepping motor being insulated from the bottle extractor by means of a sheet of thermal insulating material positioned between said stepping motor and said bottle extractor.

2. The bottle extractor for extraction of hollow glass articles from molding machines according to claim 1 wherein said mechanical arm for transfer of the hollow glass articles further comprises a position detector for detecting the position of the drive shaft.

* * * * *